United States Patent
Edara

(10) Patent No.: US 8,849,215 B2
(45) Date of Patent: Sep. 30, 2014

(54) REDUCING RATE OF DETECTION CYCLES AND MEASUREMENT CYCLES IN A DISCONTINUOUS RECEPTION (DRX) MODE

(75) Inventor: Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 317 days.

(21) Appl. No.: 13/076,153

(22) Filed: Mar. 30, 2011

(65) Prior Publication Data
US 2012/0252368 A1 Oct. 4, 2012

(51) Int. Cl.
*H04B 17/00* (2006.01)
*H04W 36/00* (2009.01)
*H04W 76/04* (2009.01)

(52) U.S. Cl.
CPC ........ *H04W 36/0088* (2013.01); *H04W 76/048* (2013.01); *H04W 36/0022* (2013.01)
USPC ...................... 455/67.11; 455/226.1; 455/436; 455/422.1; 455/550.1

(58) Field of Classification Search
USPC ............. 455/67.11, 226.1, 436, 422.1, 550.1
See application file for complete search history.

(56) References Cited

U.S. PATENT DOCUMENTS

| | | | |
|---|---|---|---|
| 7,756,082 B1 * | 7/2010 | Dhamdhere | 370/331 |
| 8,195,164 B2 * | 6/2012 | Kazmi | 455/436 |
| 8,229,434 B2 * | 7/2012 | Kazmi et al. | 455/436 |
| 8,249,004 B2 * | 8/2012 | Wang et al. | 370/329 |
| 2003/0153370 A1 * | 8/2003 | Sako | 455/574 |
| 2004/0229659 A1 * | 11/2004 | Boos et al. | 455/574 |
| 2008/0101268 A1 * | 5/2008 | Sammour et al. | 370/311 |
| 2008/0160918 A1 * | 7/2008 | Jeong et al. | 455/67.11 |
| 2008/0167089 A1 * | 7/2008 | Suzuki et al. | 455/574 |
| 2008/0227453 A1 * | 9/2008 | Somasundaram et al. | 455/436 |
| 2009/0034452 A1 * | 2/2009 | Somasundaram et al. | 370/328 |
| 2009/0088160 A1 * | 4/2009 | Pani et al. | 455/436 |
| 2009/0180447 A1 * | 7/2009 | Kim et al. | 370/338 |
| 2009/0196197 A1 * | 8/2009 | DiGirolamo et al. | 370/252 |
| 2009/0245209 A1 * | 10/2009 | Cho et al. | 370/335 |
| 2009/0258665 A1 * | 10/2009 | Bourlas et al. | 455/522 |
| 2009/0275337 A1 * | 11/2009 | Maeda et al. | 455/442 |
| 2010/0297993 A1 * | 11/2010 | Heo et al. | 455/423 |
| 2011/0105122 A1 * | 5/2011 | Wu | 455/436 |
| 2011/0269462 A1 * | 11/2011 | Sagfors et al. | 455/436 |
| 2011/0306375 A1 * | 12/2011 | Chandra et al. | 455/509 |
| 2011/0317577 A1 * | 12/2011 | Yamada et al. | 370/252 |
| 2011/0319076 A1 * | 12/2011 | Ramasamy et al. | 455/434 |
| 2012/0015658 A1 * | 1/2012 | Kim et al. | 455/436 |
| 2012/0113825 A1 * | 5/2012 | Baglin et al. | 370/252 |
| 2012/0115552 A1 * | 5/2012 | Bhattacharya | 455/574 |
| 2012/0252368 A1 * | 10/2012 | Edara | 455/67.11 |
| 2012/0257522 A1 * | 10/2012 | Adachi et al. | 370/252 |
| 2013/0044660 A1 * | 2/2013 | Edara et al. | 370/311 |
| 2013/0079009 A1 * | 3/2013 | Aumann et al. | 455/436 |
| 2013/0143571 A1 * | 6/2013 | Iwamura et al. | 455/436 |
| 2013/0155890 A1 * | 6/2013 | Bhattad et al. | 370/252 |
| 2013/0225172 A1 * | 8/2013 | Singh et al. | 455/436 |
| 2014/0112180 A1 * | 4/2014 | Axmon et al. | 370/252 |

* cited by examiner

*Primary Examiner* — Temesgh Ghebretinsae
*Assistant Examiner* — Md Talukder
(74) *Attorney, Agent, or Firm* — Lowenstein Sandler LLP

(57) ABSTRACT

A user device performs a set of measurements at a specified rate when the user device in a discontinuous reception (DRX) mode, and determines a signal condition of a signal received from a serving cell. The user device adjusts the specified rate based on the signal condition. The reduction in the rate may reduce a current drain by the user device when the user device is in the DRX mode.

21 Claims, 7 Drawing Sheets

REDUCING RATE OF DETECTION CYCLES AND MEASUREMENT CYCLES IN A DISCONTINUOUS RECEPTION (DRX) MODE

BACKGROUND OF THE INVENTION

A large and growing population of users is enjoying entertainment through the consumption of digital media items, such as music, movies, images, electronic books, and so on. The users employ various electronic devices to consume such media items. Among these electronic devices (referred to herein as user device and user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. Typically, the communications infrastructure requires that when a user equipment (UE) is in a Discontinuous Reception (DRX) Mode (e.g., idle mode, CELL_PCH, and URA_PCH), the UE wakes up from a sleep mode periodically to decode any pages sent to the UE and performs various measurements, as defined in a standard specification, such as, for example, the $3^{rd}$ Generation Partnership Project (3GPP) specification. For example, the 3GGP specification indicates when camped on a Wideband Code Division Multiple Access (WCDMA) cell the UE is to perform serving cell measurements, neighboring cell detections, and neighboring cell measurements. These measurements are performed at a specified rate, as defined by the standard specification. The amount of time that the UE is active to perform these measurements depends upon the number of neighbor cell measurements performed. The longer the UE is active to perform these measurements, the greater the current drain is on the UE.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
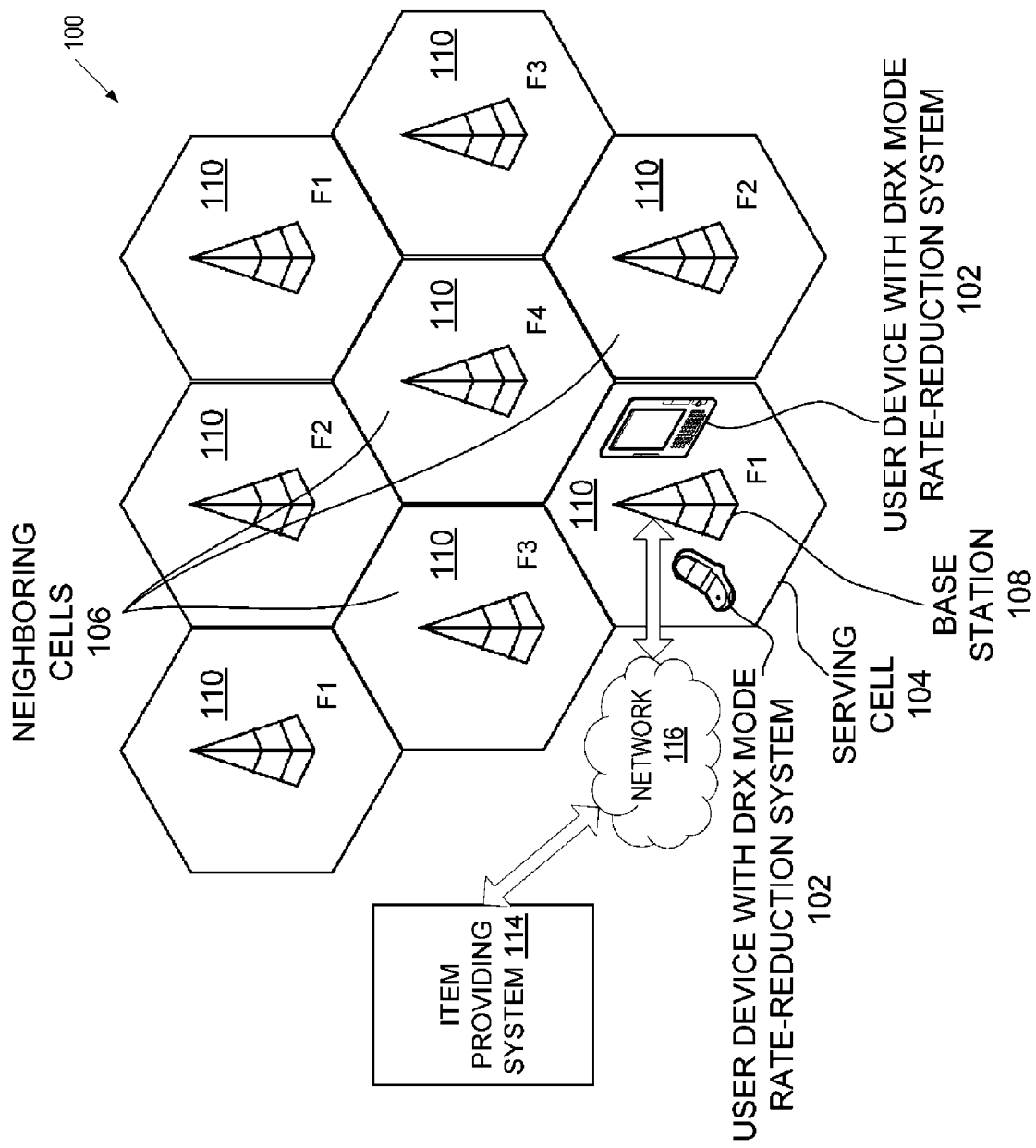
FIG. 1 is a diagram of an exemplary cellular network architecture in which embodiments of the invention may operate.

Methods and systems for reducing a specified rate at which a user device performs detection cycles and measurement cycles in a DRX mode. The DRX mode may include an idle mode, URA_PCH mode, CELL_PCH mode, or any other mode in which the user device wakes up periodically from being asleep, and periodically decodes any pages, and performs serving cell and neighboring cell measurements. A user device may be any mobile device, most of which can connect to a network. Examples of user devices include electronic book readers, cellular telephones, personal digital assistants (PDAs), portable media players, tablet computers, netbooks, and the like. A user device may connect to a network to obtain content from a server (e.g., an item providing system) or to perform other activities. The user device may connect to one or more different types of cellular networks. A cellular network is a radio network distributed over land areas called cells, each served by at least one fixed-location transceiver typically known a base station. When joined together these cells provide radio coverage over a wide geographic area. This enables a large number of portable transceivers of user devices to communicate with each other and with fixed transceivers and telephones anywhere in the network, via base stations, even if some of the transceivers are moving through more than one cell during transmission.

In one embodiment, a user device performs a set of one or more measurements at a specified rate when the user device is in a DRX mode. The user device also determines a signal condition of a signal received from a serving cell, and the user device adjusts the specified rate based on the signal condition. In one embodiment, the set of measurements includes a detection cycle to detect one or more neighboring cells, a measurement cycle to measure parameters of one or more of the detected neighboring cells, or any combination thereof. For example, the measurement cycle may include performing an intra-frequency measurement for each of the detected neighboring cells, performing an inter-frequency measurement for each of the detected neighboring cells, and an inter-radio access technology (rat) measurement or detection for one or more of the neighboring cells. The user device performs each of these measurements at the same specified rate, or at individual specified rates. Based on the signal condition, the user device adjusts the specified rate or the individual rates of each of these measurements. This rate-reduction may reduce a current drain by the user device when the user device is in the DRX mode.

In one embodiment, the user device performs the rate of the intra-frequency, inter-frequency, and inter-rat measurements and detections at specified rates, as defined in a standard specification, such as the 3GPP specification. For example, when the user device is in WCDMA idle mode, URA_PCH mode, or CELL_PCH mode, the user device wakes up periodically from being asleep, and periodically decodes any pages, and performs serving cell and neighboring cell measurements, as defined by the 3GPP specification. The amount of time the user device's receiver is active depends on the number of neighboring cell measurements to be performed. The longer the user device's receiver is active the greater the current drain of the user device. For example, per the 3GPP specification, the user device is supposed to perform intra-frequency, inter-frequency, and inter-rate measurements as per rules specified in the specification. These rules use a threshold value to indicate when the particular measurements should be performed or not. Using the embodiments described herein, the user device reduces the rate of the intra-frequency, inter-frequency, and inter-rat measurements and detections when the serving cell's signal is above a threshold level (e.g., zero), and changes the rate back to what the specified rates (e.g., as defined in the standard specification) when the user device detects that the serving cell's signal falls below the threshold level (e.g., below zero). Doing this may significantly reduce the amount of time the receiver of the user device is active, reducing the current drain. For example, by reducing the measurements and detections in idle mode by half, the rate reduction may result in current savings of approximately 25-30% in one embodiment. Alternatively, the rate reduction embodiments may provide more or less current savings based on other factors of the user device. The embodiments described herein may help improve battery life significantly. In addition, these embodiments may reduce the current drain without impacting the user's experience, since the rate-reduction may delay reselection to a better neighboring cell when the serving cell's signal is still reasonably good. For example, when the display of the user device is turned off or the user device is in a sleep mode or low-power mode, the user device may use the DRX mode rate-reduction to further reduce the current drain while the user device is in the idle mode. Alternatively, the user device may perform the rate-reduction when other conditions apply.

In one embodiment, the user device includes a processing device that is configured to execute a DRX mode rate-reduction system when the user device is in the idle mode. The DRX mode rate-reduction system can send an indication to a modem of the user device to indicate the change in rates, and the modem starts using the adjusted rates to reduce energy consumption by the user device.

FIG. 1 is a diagram of exemplary cellular network architecture 100 in which embodiments of the invention may operate. The cellular network architecture 100 may multiple cells 110, including a serving cell 104 currently serving a user device 102, and neighboring cells 106. Each cell includes a base station 108 configured to communicate with user devices within the cell. These cells 110 may communicate with the user devices 102 using the same frequency, different frequencies, same communication type (e.g., WCDMA, GSM, LTE, CDMA, WiMax, etc), or different communication types. Each of the base stations 108 may be connected to a private, a public network 116, or both, such as the Internet, a local area network (LAN), a public switched telephone network (PSTN), or the like, to allow the user devices 102 to communicate with other devices, such as other user devices, server computing systems, telephone devices, or the like.

The user devices 102 are variously configured with different functionality and may include various mobile computing devices such as electronic book readers, portable digital assistants, mobile phones, laptop computers, portable media players, tablet computers, cameras, video cameras, netbooks, notebooks, desktop computers, gaming consoles, DVD players, media centers, and the like. In some embodiments, the user devices 102 are configured to enable consumption of one or more types of media items including, for example, electronic texts (e.g., eBooks, electronic magazines, digital newspapers), digital audio (e.g., music, audible books), digital video (e.g., movies, television, short clips), images (e.g., art, photographs), and multi-media content.

In one embodiment, the user devices 102 communicate with an item providing system 114 via the base station 108 and network 116. The item providing system 114 may download items, upgrades, and/or other information to the user devices 102 registered with the item providing system 114 via the network 116. The item providing system 114 may also receive various requests, instructions and other data from the user devices 102 via the network 116. The item providing system 114 may operate in the capacity of a server machine in client-server network environment. The item providing system 114 may include one or more machines (e.g., one or more server computer systems, routers, gateways) that have processing and storage capabilities to provide the above functionality. Communication between the item providing system 114 and a user device 102 may be enabled via any communication infrastructure, such as the cellular network architecture 100. One example of such an infrastructure includes a combination of a wide area network (WAN) and wireless infrastructure, which allows a user to use the user device 102 to purchase items and consume items without being tethered to the item providing system 114 via hardwired links. The wireless infrastructure may be provided by one or multiple wireless communications systems, such as one or more wireless communications system, a wired communication system, or any combination thereof. One of the wireless communication systems may be a wireless fidelity (WiFi) hotspot connected with the network 116. Another of the wireless communication systems may be a wireless carrier system, such as illustrated in the cellular network architecture 100 of FIG. 1, which can be implemented using various data processing equipment, communication towers, etc. Alternatively, or in addition, the wireless carrier system may rely on satellite technology to exchange information with the user device 102. The communication infrastructure may also include a communication-enabling system that may serve as an intermediary in passing information between the item providing system 114 and the wireless communication system (e.g., 100). The communication-enabling system may communicate with the wireless communication system via a dedicated channel, and may communicate with the item providing system 114 via a non-dedicated communication mechanism, e.g., a public Wide Area Network (WAN) such as the Internet.

In one embodiment, the user device 102 includes a DRX mode rate-reduction system that allows the user device 102 to reduce an initial rate at which the user device performs at least one of a detection cycle to detect one or more neighboring cells 106 or a measurement cycle to measure parameters of one or more detected neighboring cells 106. This may reduce the current drain by the user device 102. The configuration and operations of the DRX mode rate-reduction system are described below with respect to FIGS. 2-7.

Figure 2:
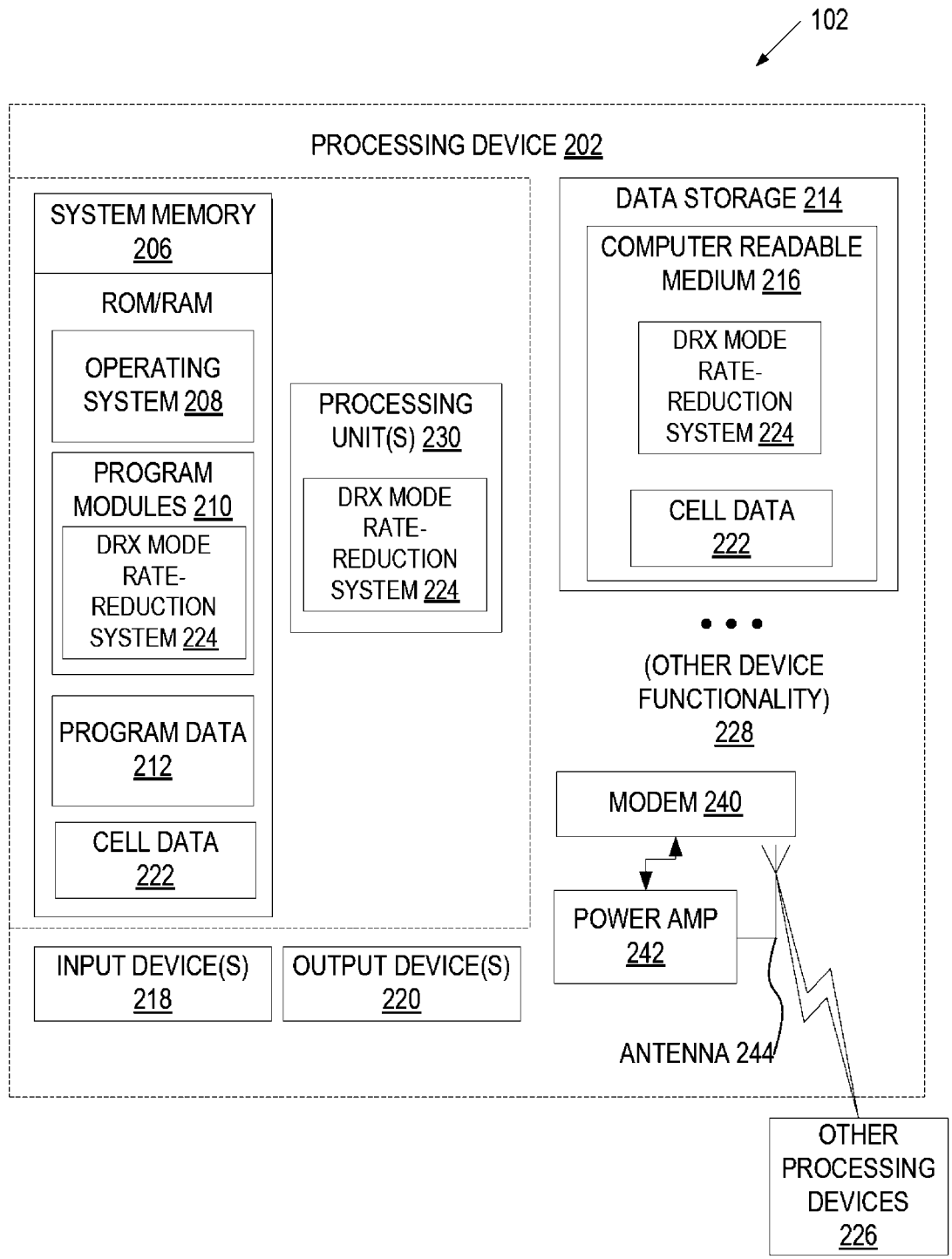
FIG. 2 is a block diagram of one embodiment of a user device having a DRX mode rate-reduction system.

FIG. 2 is a block diagram of one embodiment of a user device 102 having a DRX mode rate-reduction system 224. The user device 102 may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 102 includes one or more processing devices 202, such as one or more CPUs, microcontrollers, field programmable gate arrays, or other types of processors. The user device 102 also includes system memory 206, which may correspond to any combination of volatile and/or non-volatile storage mechanisms. The system memory 206 stores information which provides an operating system component 308, program modules 210 including the DRX mode rate-reduction system 224, program data 212, cell data 222, and/or other components. The user device 102 performs functions by using the processing units 230 to execute the DRX mode rate-reduction system 224 and other instructions provided by the system memory 206. In one embodiment, the user device 102 executes a set of instructions for causing the user device to perform any one or more of the methodologies discussed herein. The user device may be connected (e.g., networked) to other machines in a LAN, an intranet, an extranet, or the Internet. The user device 102 may operate in the capacity of a client machine in client-server network environment. The user device 102 may be any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The processing device 202 represents one or more general-purpose processing devices such as a microprocessor, central processing unit, or the like. More particularly, the processing device 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. As described above, the processing device 202 is configured to execute the DRX mode rate-reduction system 224 for performing the operations and steps discussed herein.

The user device 102 may also include a data storage device 214 that may be composed of one or more types of removable storage and/or one or more types of non-removal storage (e.g., read-only memory (ROM), flash memory, dynamic random access memory (DRAM) such as synchronous DRAM (SDRAM), flash memory, static random access memory (SRAM)). The data storage device 214 may include a computer-readable medium 216 on which is stored one or more sets of instructions (e.g., instructions of the DRX mode rate-reduction system 224) embodying any one or more of the methodologies or functions described herein. As shown, instructions of the DRX mode rate-reduction system 224 may also reside, completely or at least partially, within the system memory 206 and/or within the processing unit(s) 230 during execution thereof by the user device 102, the system memory 206 and the processing unit(s) 230 also constituting computer-readable media. The instructions of the DRX mode rate-reduction system 224 may further be transmitted or received over a network via a network interface device.

While the computer-readable storage medium 216 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The user device 102 may also include one or more input devices 218 (keyboard, mouse device, specialized selection keys, etc.) and one or more output devices 220 (displays, printers, audio output mechanisms, etc.). The user device 102 may further include network interface devices, video displays (e.g., liquid crystal displays (LCDs) or a cathode ray tube (CRT)).

The user device 102 further includes a wireless modem 240 to allow the user device 102 to communicate via a wireless network (e.g., such as provided by the wireless communication system) with other computing devices, such as remote computers, the item providing system 114, and so forth. The wireless modem 240 allows the user device 102 to handle both voice and non-voice communications (such as communications for text messages, multimedia messages, media downloads, web browsing, etc.) with the wireless communication system 110. The wireless modem 240 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, LTE, CDMA, WiMax, etc.

The wireless modem 240 may generate signals and send these signals to power amplifier (amp) 242 for amplification, after which they are wirelessly transmitted via antenna 244. Antenna 244 may be configured to transmit in different frequency bands and/or using different wireless communication protocols. The antenna 244 may be a directional, omnidirectional, or non-directional antenna. In addition to sending data, antenna 244 also receive data, which is sent to wireless modem 240 and transferred to processing units 230.

Though a single modem 240 is shown to control transmission by the antenna 244, the user device 102 may alternatively include multiple wireless modems, each of which is configured to transmit data via a different antenna and/or wireless transmission protocol. In one embodiment, each modem includes a transceiver or a transmitter and a receiver. The processing units 230 control the modem 240.

The above-enumerated list of modules is representative and is not exhaustive of the types of functions performed by the user device 102. As indicated by the label "Other Device Functionality" 228, the user device 102 may include additional functions.

Figure 3:
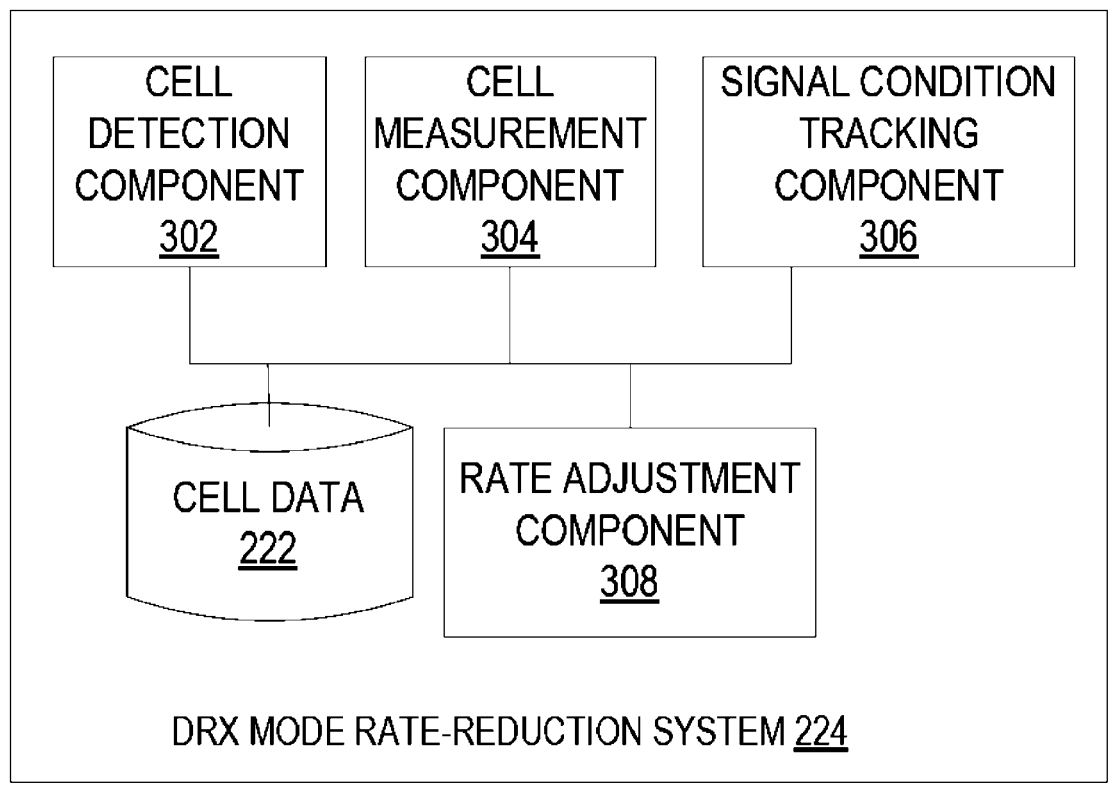
FIG. 3 is a block diagram of one embodiment of the DRX mode rate-reduction system.

FIG. 3 is a block diagram of one embodiment of the DRX mode rate-reduction system 224. The DRX mode rate-reduction system 224 may be implemented as hardware (circuitry, dedicated logic, etc.), software (such as is run on a general purpose computing system or a dedicated machine), firmware (embedded software), or any combination thereof. In the depicted embodiment, the DRX mode rate-reduction system 224 includes a cell detection component 302, a cell measurement component 304, a signal condition tracking component 306, and a rate adjustment component 308. The components of the DRX mode rate-reduction system 200 may represent modules that can be combined together or separated into further modules, according to some embodiments.

The cell detection component 302 is configured to detect neighboring cells. The cell detection component 302 can store information regarding the detected neighboring cells in a cell data store 222. The cell measurement component 304 is configured to perform one or more measurements of the detected cells. The cell measurement component 304 can store the results of these measurements in the cell data store 222. In one embodiment, the cell measurement component 304 performs an inter-frequency measurement for each of the neighboring cells listed in the cell data store 222. In another embodiment, the cell measurement component 304 performs an intra-frequency measurement for each of the neighboring cells listed in the cell data store 222. In another embodiment, the cell measurement component 304 performs an inter-rat measurement or detection of one or more neighboring cells. The cell measurement component 304 performs each of these measurements according to a specified rate. In some cases, the specified rates are the initial rates, as defined in the specification. In other cases, the specified rates are the adjusted rates.

The signal condition tracking component 306 is configured to track the signal condition of a signal received from the serving cell. The signal condition tracking components 306 measures the signal condition according to various techniques as described herein. In one embodiment, the signal condition tracking component 306 measures a cell quality value or a cell receive (RX) level value, and uses this value as the signal condition. In another embodiment, the signal condition tracking component 306 measures one of these values, and subtracts a minimum required quality level and a power compensation value from this value. The signal condition is equal to the cell quality value or the cell RX level value after the subtraction. The power compensation value may be determined by subtracting a maximum RF output power from a maximum transmission power, and the greater of the resulting value and zero is used for the power compensation value. The signal condition tracking component 306 may store the results in the cell data store 222 or a separate data store. Alternatively, the signal condition tracking component 306 may not store the signal condition, but performs the calculation when needed.

The rate adjustment component 308 is configured to adjust the specified rate(s) of the set of measurements performed by the cell measurement component 304 based on the signal condition. In one embodiment, the rate adjustment component 308 adjusts each of the specified rates for the intra-frequency measurements, inter-frequency measurements, and inter-rat measurements or detections. In another embodiment, the rate adjustment component 308 adjusts the specified rate of the detections performed by the cell detection component 302. In another embodiment, the rate adjustment component 308 adjusts the specified rates of both the cell detection component 302 and the cell measurement component 304.

In one embodiment, the rate adjustment component 308 receives an indication from the signal condition tracking component of the signal condition, and the rate adjustment component 308 compares the signal condition against one or more signal condition thresholds to determine an adjusted rate. After determines the adjusted rate, the rate adjustment component 308 sends an indication of the adjusted rate to the cell measurement component 304 and/or the cell detection component 302. In another embodiment, the rate adjustment component 308 overwrites or updates a memory location in memory (e.g., non-volatile memory) that is accessed by the cell detection component 302 and/or the cell measurement component 304.

In one embodiment, the rate adjustment component 308 adjusts one of the specified rates to a first rate when the signal condition is less than a first signal condition threshold, and adjusts the specified rate to a second rate when the signal condition is equal to or greater than the first signal condition threshold. In this embodiment, the second rate is less than the first rate. In this embodiment, the signal condition threshold is used to represent a "good" signal condition. When the signal has a "good" signal condition, the rate adjustment component 308 can reduce the rate of the measurements performed during DRX mode.

In a further embodiment, the rate adjustment component 308 adjusts the specified rate to a third rate when the signal condition is equal to or greater than a second signal condition. In this embodiment, the third rate is less than the first rate, but the second rate may be between the first and third rate, or greater than the third rate. In another embodiment, the rate adjustment component 308 incrementally adjust the specified rates as the signal condition decreases towards a first signal condition threshold, and incrementally reduces the specified rate as the signal condition increases away from the first signal condition threshold. Alternatively, other techniques of reducing and increasing the specified rates based on the signal condition may be used as would be appreciated by one of ordinary skill in the art having the benefit of this disclosure.

In one embodiment, the cell detection component 302 can control the modem of the user device to perform the detection cycle at the specified rate (e.g., initial rate or the adjusted rate). In another embodiment, the rate adjustment component 308 sends an indication directly to the modem to indicate the specified rate for performing the set of measurements. Similarly, the cell measurement component 302 can control the modem, or the rate adjustment component 308 can send an indication directly to the modem to indicate the specified rate for performing the set of measurements.

Figure 4:
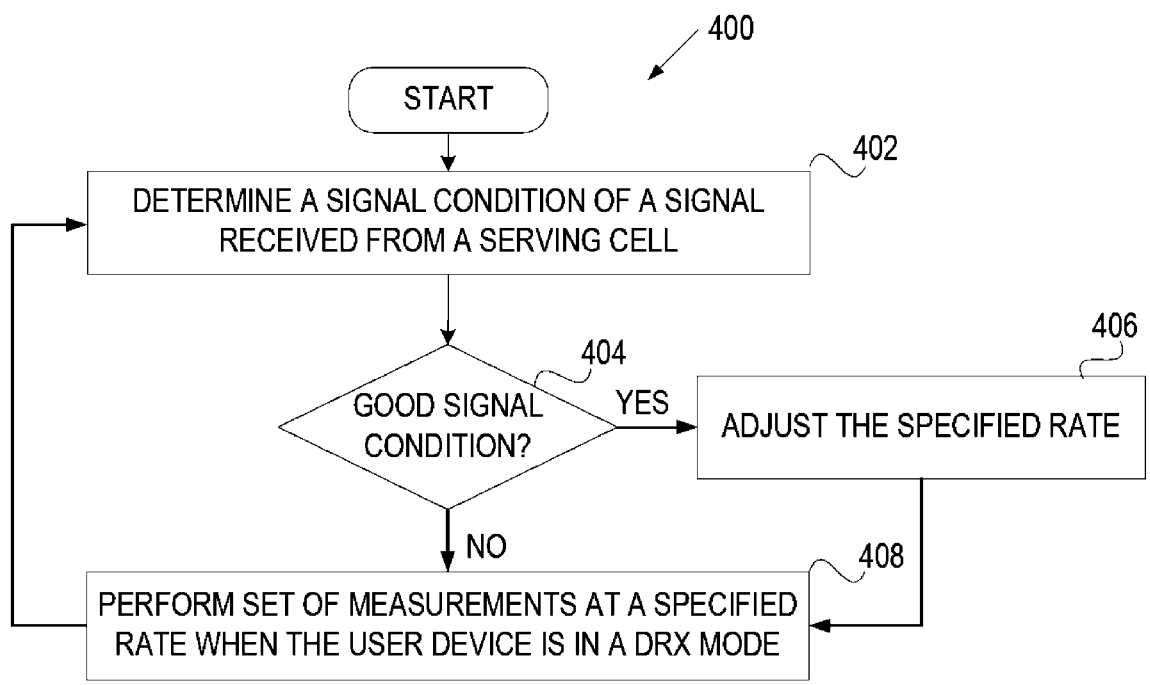
FIG. 4 is a flow diagram of one embodiment of a method for reducing a specified rate at which the user device performs detection cycles and measurement cycles in a DRX mode.
Figure 5:
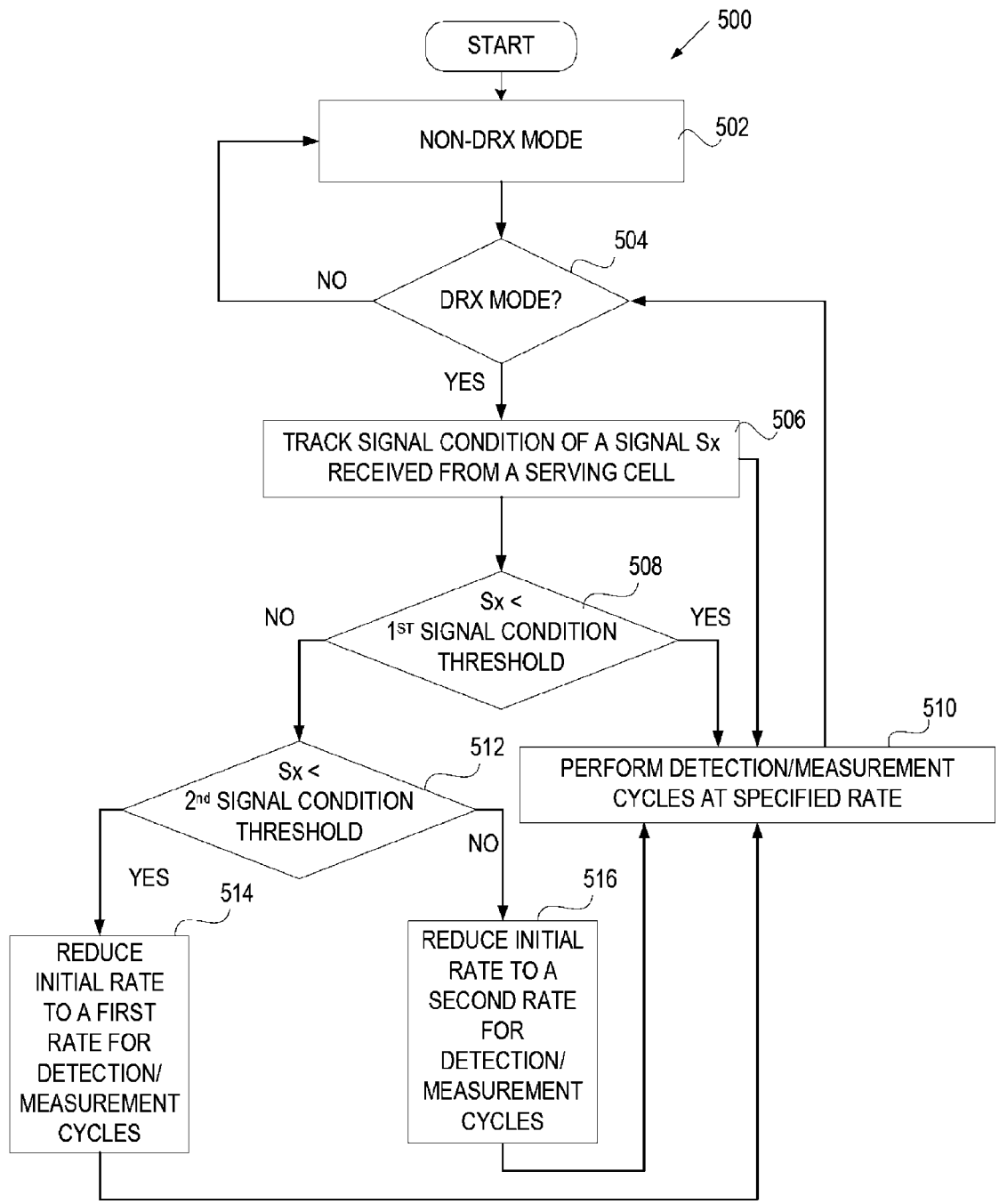
FIG. 5 is a flow diagram of another embodiment of a method of adjusting a specified rate for performing a set of one or more measurements based on a signal condition of a signal received from a serving cell.

FIGS. 4-5 illustrate methods performed in accordance with various embodiments of the invention. The methods are performed by processing logic that may comprise hardware (circuitry, dedicated logic, etc.), software (such as is run on a general purpose computer system or a dedicated machine), or a combination of both.

FIG. 4 is a flow diagram of one embodiment of a method 400 of adjusting a specified rate for performing a set of one or more measurements based on a signal condition of a signal received from a serving cell. In one embodiment, a user device (e.g., user device 102 of FIG. 1) performs the method 400. In another embodiment, the DRX mode rate-reduction system 224 of FIGS. 2 and 3 performs the method 400. Alternatively, other components of the user device 102 can perform some or all of the operations of method 400.

Referring to FIG. 4, method 400 starts by processing logic determining a signal condition of a signal received from a serving cell (block 402). The processing logic determines if the signal condition is good (e.g., the signal condition is equal to or greater than a signal condition threshold) (block 404). If the signal condition is good, the processing logic adjusts the specified rate (block 406) and returns to perform a set of measurements at the adjusted rate when the user device is in a DRX mode (block 408). Otherwise, if the signal condition is not good at block 404, the processing logic maintains the specified rate, and performs the set of one or more measurements at a specified rate when the user device is in a DRX mode (block 408).

In another embodiment of the method, the processing logic performs, for the set of measurements at block 408, at least one of a detection cycle to detect one or more neighboring cells or a measurement cycle to measure parameters of one or more detected neighboring cells. In one embodiment, for the measurement cycle at block 408, the processing logic performs an intra-frequency measurement for each of the detected neighboring cells at a first specified rate, an inter-frequency measurement for each of the detected neighboring cells at a second specified rate, and an inter-rat measurement or detection of one or more neighboring cells at a third specified rate. The processing logic at block 406 adjusts the first, second, and third specified rates. In one embodiment, the first, second, and third rates are the same rate. In another embodiment, the first, second, and third rates are different rates.

In another embodiment, the processing logic at block 402 measures a cell quality value for the signal condition. In another embodiment, the processing logic at block 402 measures a cell quality value of the received signal, and subtracts a minimum required quality level and a power compensation value from the cell quality value. In this embodiment, the signal condition is equal to the cell quality value after the subtraction. In one embodiment, the processing logic can determine the power compensation value by determining a maximum transmission power level (UE_TXPWR_MAX_RACH dBm) that can be used by the user device when accessing the serving cell on a random access channel (RACH), and determining a maximum radio frequency (RF) output power (P_MAX dBm) of the user device. The processing logic subtracts the maximum RF output power from the maximum transmission power to generate a computed value. The processing logic then determines if the computed value is greater than zero. If so, the processing logic uses the computed value as the compensation value, and if not, the processing logic uses zero as the compensation value. In one exemplary embodiment, a max operation can be used for this calculation (e.g., max(UE_TXPWR_MAX_RACH-P_MAX, 0) (dB)). The maximum transmission power level (UE_TXPWR_MAX_RACH) may be read in the system information stored in memory (dBm). Alternatively, other techniques may be used to compute the compensation factor, as well as the cell quality value.

In another embodiment, the processing logic at block 402 measures a cell receive (RX) level value for the signal condition. In another embodiment, the processing logic subtracts the minimum required quality level in the serving cell, and the power compensation value from the cell RX level value, and the signal condition is equal to the cell RX level value after the subtraction. The minimum required quality level is broadcast by base stations in a given cell and read by the user device before camping on the cell.

In another embodiment, the processing logic at block 406 adjusts the specified rate by adjusting the specified rate to a first rate when the signal condition is less than a first signal condition threshold, and adjusts the specified rate to a second rate when the signal condition is greater than the first signal condition threshold. In this embodiment, the second rate is less than the first rate. In another embodiment, the processing logic at block 406 further adjusts the specified rate to a third rate when the signal condition is greater than a second signal condition threshold, the third rate being less than the first rate. In one embodiment, the third rate is less than the second rate. In another embodiment, the third rate is greater than the second rate but less than the first rate.

In another embodiment, the processing logic at block 406 adjusts the specified rate by incrementally increasing the specified rate as the signal condition decreases towards a first signal condition threshold, and incrementally reduces the specified rate as the signal condition increases away from the first signal condition threshold. Alternatively, the processing logic can gradually increase and decrease the specified rate as the signal condition fluctuates. This may be done periodically by sampling the signal condition. This may also be done continuously.

Figure 6:
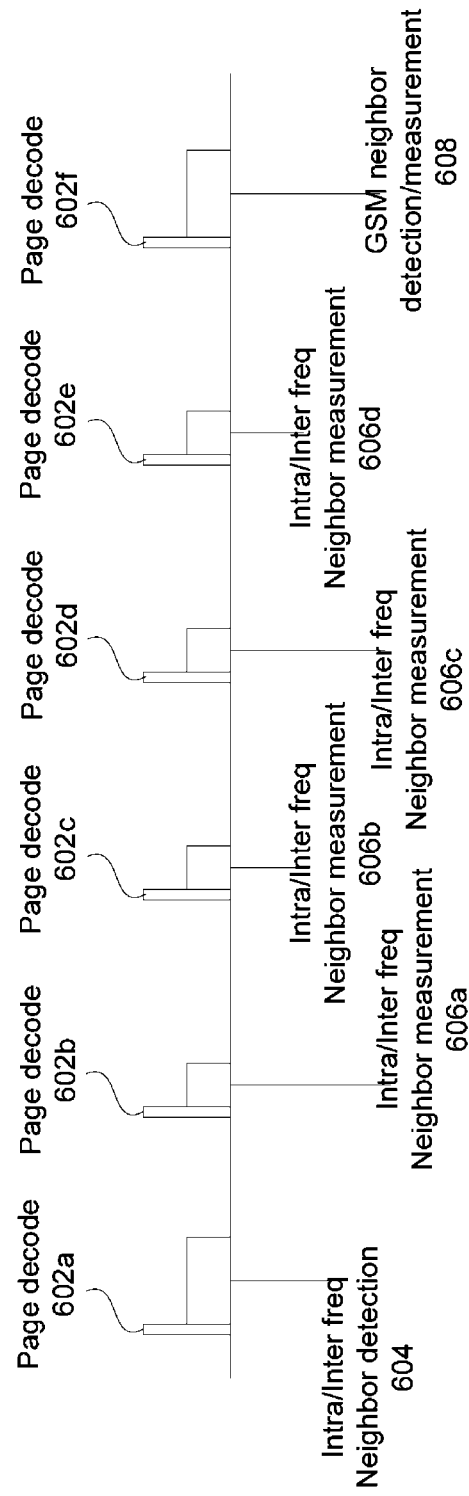
FIG. 6 illustrates a DRX mode of a user device without the DRX mode rate-reduction.
Figure 7:
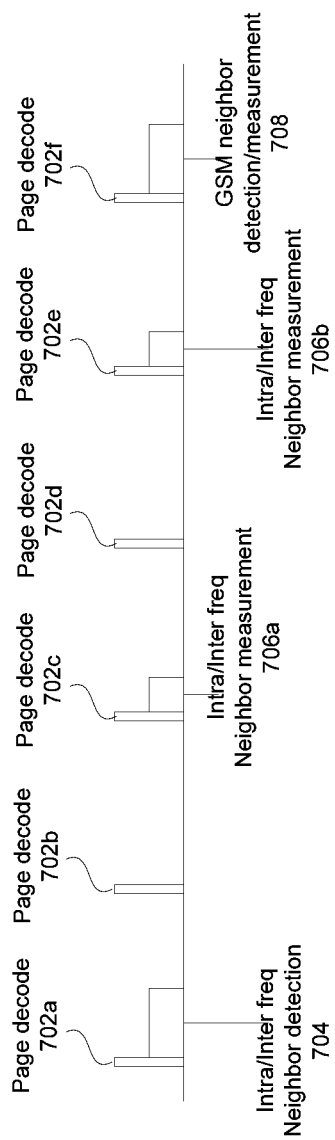
FIG. 7 illustrates a DRX mode of a user device with the DRX mode rate-reduction according to one embodiment.

As shown in FIGS. 6 and 7, the specified rate may be every paging cycle when the user device is in DRX mode, and the adjusted rate may be less than every paging cycle. In another embodiment, the specified rate is defined by a standard specification, such as the 3GPP specification. The adjusted rate is a variable rate that is less than the specified rate. The variable rate is set based on the signal condition. The variable rate may be set at discrete levels using one or more thresholds, or may be any rate based on a linear relationship to the signal condition. Alternatively, the variable rate may have a non-linear relationship to the signal condition.

FIG. 5 is a flow diagram of another embodiment of a method of adjusting a specified rate for performing a set of one or more measurements based on a signal condition of a signal received from a serving cell. In one embodiment, a user device (e.g., user device 102 of FIG. 1) performs the method 500. In another embodiment, the DRX mode rate-reduction system 224 of FIGS. 2 and 3 performs the method 500. Alternatively, other components of the user device 102 can perform some or all of the operations of method 500.

Referring to FIG. 5, method 500 starts by processing logic operating in a non-DRX mode of operation (block 502), and determines if the user device is in a DRX mode (block 504). If the user device is not in DRX mode, the processing logic continues in the non-DRX mode at block 502. However, if the user device is in DRX mode at block 504, the processing logic tracks a signal condition of a signal (Sx) received from a serving cell (block 506). The processing logic compares the signal condition (Sx) against a first signal condition threshold (block 508). If the signal condition (Sx) is less than the first signal condition threshold, the processing logic performs detection and/or measurement cycles at one or more specified rates (block 510). Initially the specified rates can be the initial rate(s) specified in the standard specification. The detection cycle(s) can be used to detect one or more neighboring cells. The detection of neighboring cells and measurements of already detected cells can be performed during the same cycle. Also, during detection, if a neighboring cell is detected then a measurement is also known for that cell. The measurement cycle(s) can be used to measure parameters of one or more detected neighboring cells. However, if the signal condition (Sx) is equal to or greater than the first signal condition threshold at block 508, the processing logic reduces the initial rate at which the user device performs the detection cycles and/or measurement cycles. In one embodiment, the processing logic reduces the initial rate to a different rate that is less than the initial rate. Alternatively, the processing logic reduces the initial rate to one of multiple rates based on one or more additional signal condition thresholds, for example, first and second rates depicted in FIG. 5.

In the depicted embodiment, the processing logic compares the signal condition (Sx) against a second signal condition threshold (block 512). If the signal condition (Sx) is less than the second signal condition threshold (but greater than or equal to the first signal condition threshold) at block 508, the processing logic reduces the initial rate to a first rate for the detection cycle(s) and/or measurement cycle(s) (block 514), and returns to block 510 to perform the detection and/or measurement cycles at the specified rate. In this case, the specified rate is the first rate. However, if the signal condition (Sx) is equal to or greater than the second signal condition threshold at block 512, the processing logic reduces the initial rate to a second rate for the detection cycle(s) and/or measurement cycle(s) (block 516), and returns to block 510 to perform the detection and/or measurement cycles at the specified rate. In this case, the specified rate is the second rate.

In another embodiment, the processing logic implements the algorithm described below to adapt the rate of the intra-frequency, inter-frequency, and inter-rat neighboring cell measurements based on the serving cell's signal conditions. When the serving cell's signal conditions are "good," as set by a signal condition threshold, the processing logic keeps the rate slow, and as the signal conditions starts to worsen, the processing logic slowly increases the rate of measurement to eventually match the initial rates, as defined in the standard specification. One or more signal condition thresholds may be used, and the signal condition thresholds can be hard-coded, or programmable. For example, a non-volatile memory may store the signal condition thresholds. The following algorithm uses the following notations for the initial rates and the specified number of threshold levels (also called threshold buckets).

$R_{intra}$ is the rate of performing intra frequency measurements
$R_{inter}$ is the rate of performing inter frequency measurements
$R_{interrat}$ is the rate of performing inter-rat measurements
$N_{intrasearch}$ is the number of threshold levels from 0 and $S_{intrasearch}$
$N_{intersearch}$ is the number of threshold levels from 0 and $S_{intersearch}$
$N_{interratsearch}$ is the number of threshold levels from 0 and $S_{searchrat}$
Sintrasearch specifies the threshold (in dB) for intra frequency measurements and for the HCS measurement rules.
Sintersearch specifies the threshold (in dB) for inter-frequency measurements and for the HCS measurement rules.
SsearchRATm specifies the RAT specific threshold in the serving cell used in the inter-RAT measurement rules.
Qqualmeas is the measured cell quality value. The quality of the received signal expressed in CPICH Ec/N0 (dB) for FDD cells.
Qrxlevmeas is the measured cell RX level value. This is received signal, CPICH RSCP for FDD cells (dBm).
Qqualmin is the minimum required quality level in the cell (dB). Applicable only for FDD cells.
Qrxlevmin is the minimum required RX level in the cell (dBm)
Squat is the Cell Selection quality value (dB). Applicable only for FDD cells.
Srxlev is the Cell Selection RX level value (dB)
Squat is the difference between the measured cell quality value and the minimum required quality level (Qqualmeas-Qqualmin)
Srxlev is the difference between the measured cell RX level value, minimum required RX level, and power compensation value (Qrxlevmeas-Qrxlevmin-Pcompensation)
Sx is defined as Squal for FDD cells and Srxlev for TDD cells
Pcompensation is the power compensation value. The power compensation value may be computed using max(UE_TX-PWR_MAX_RACH-P_MAX, 0) (dB)
UE_TXPWR_MAX_RACH is the maximum TX power level an UE may use when accessing the cell on RACH (read in system information) (dBm)
P_MAX is the maximum RF output power of the UE (dBm)

```
FOR (i=1, i<=N_intrasearch, i++)
    IF (S_x > S_intrasearch * (i – 1)/N_intrasearch) AND (S_x <= S_intrasearch *
    i/N_intrasearch)
        THEN
            Perform intra frequency measurements at the rate of 1/(R_intra * i)
        ENDIF
ENDFOR
FOR (i=1, i<=N_intersearch, i++)
    IF (S_x > S_intersearch * (i – 1)/N_intersearch) AND (S_x <= S_intersearch *
    i/N_intersearch)
        THEN
            Perform inter frequency measurements at the rate of 1/(R_inter * i)
        ENDIF
ENDFOR
FOR (i=1, i<=N_interratsearch, i++)
    IF (S_x > S_searchratm * (i – 1)/N_interratsearch) AND (S_x <= S_searchratm *
    i/N_interratsearch)
        THEN
            Perform inter-rat measurements at the rate of 1/(R_interrat * i)
        ENDIF
ENDFOR
```

In one embodiment, $R_{intra}$, $R_{inter}$, and $R_{interrat}$ are the same initial rates. In another embodiment, the $R_{intra}$, $R_{inter}$, and $R_{interrat}$ are different initial rates. It should also be noted that the algorithm can perform any one of these computations to reduce the rate for any one or more of these rates as would be appreciated by one of ordinary skill in the art having the benefit of this disclosure. It should also be noted that there may be other conditions that trigger the DRX mode rate-reduction algorithms described above with respect to FIGS. 4 and 5. In one embodiment, a number of signal bars on a device can be used to decide if the DRX mode rate-reduction algorithms should be used. For example, if the signal condition is better than 3 bars, then use the DRX mode rate-reduction algorithm can be used. In another embodiment, a user device may have one or more sensors to detect when the user device is stationary. When stationary, the DRX mode rate-reduction algorithm may be used. In another embodiment, if the device already has another service like WiFi (along with WCDMA), then the user device can use the DRX mode rate-reduction algorithm. Alternatively, other conditions may be used as would be appreciated by one of ordinary skill in the art having the benefit of this disclosure.

As described herein, by reducing these rates, as well as the rates of detection cycles, reduce the amount of time the receiver of the user device is active, which reduces the current drain by the user device. For example, by reducing the intra- and inter-frequency measurements and detections by half while in the DRX mode, may result in current savings of approximately 25-30%. For another example, by reducing the intra- and inter-frequency measurements and detections by ¼ while in the DRX mode, may result in current savings of approximately 50-55%. Alternatively, other current savings may be achieved based on other factors. This may help improve battery life significantly as would be appreciated by one of ordinary skill in the art having the benefit of this disclosure.

FIGS. 6 and 7 illustrate paging cycles, detections, and measurements performed by the user device in a DRX mode with and without the DRX mode rate-reduction according to one embodiment. In FIG. 6, the user device without the DRX mode rate-reduction periodically wakes up from sleep and performs a page decode operation 602 at each paging cycle (602a-602f). Initially, the user device performs intra- and inter-frequency neighbor detection cycles 604 to detect one or more neighboring cells, and, for each subsequent cycle, the user device performs intra- and inter-frequency neighbor measurements 606 for each of the neighboring cells (606a-606d). As described herein, the more neighboring cells detected, the longer amount of time the receiver of the user device is active. In addition, as illustrated in FIG. 6, the user device may perform a GSM neighbor detection or measurement 608 in addition to the frequency and detection measurements 604 and 606. In this embodiment, the specified rate is every paging cycle.

In FIG. 7, the user device with the DRX mode rate-reduction periodically wakes up from sleep and performs a page decode operation 702 at each paging cycle (702a-702f). Initially, the user device performs intra- and inter-frequency neighbor detection cycles 604 to detect one or more neighboring cells. However, unlike in FIG. 6, the user device performs the intra- and inter-frequency neighbor measurement cycles 706 at a reduced rate (706a and 706b). In this particular case, the user device performs the intra- and inter-frequency neighbor measurement cycles 706 every other cycle (half of the cycles). The user device does not perform the intra- and inter-frequency neighbor measurement cycles 706 at the second paging cycle 702b and the fourth paging cycle 702d, unlike the user device in FIG. 6. Alternatively, other rates may be used for the intra- and inter-frequency neighbor measurement cycles 706. This reduces the amount of time the receiver of the user device is active, thus, reducing current drain by the user device. In addition, as illustrated in FIG. 7, the user device may perform a GSM neighbor detection or measurement 708 in addition to the frequency and detection measurements 704 and 706. Using the embodiments described herein, the user device may adjust the rates of performing the intra- and inter-frequency neighbor detection cycles 704 and the GSM neighbor detection or measurement cycles 708 as would be appreciated by one of ordinary skill in the art having the benefit of this disclosure.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "determining," "prompting," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
performing, by a user device, a set of one or more measurements at an initial set of rates when the user device is in a discontinuous reception (DRX) mode, wherein the set of one or more measurements comprises an intra-frequency measurement for each of detected neighboring cells and an inter-frequency measurement for each of the detected neighboring cells;
determining a signal condition of a signal received from a serving cell; and
adjusting the initial set of rates based on the signal condition, wherein the adjusting the initial set of rates based on the signal condition comprises:
comparing the signal condition against a first plurality of threshold levels for the intra-frequency measurement and selecting a corresponding rate from a first plurality of rates for the intra-frequency measurement based on the comparing, wherein the first plurality of threshold levels comprise at least three threshold levels that are defined from zero to a first initial threshold, $S_{intrasearch}$, corresponding to a first initial rate of the initial set for the intra-frequency measurement; and
comparing the signal condition against a second plurality of threshold levels for the inter-frequency measurement and selecting a corresponding rate for the inter-frequency measurement based on the comparing against the second plurality of threshold levels, wherein the second plurality of threshold levels comprise at least three threshold levels that are defined from zero to a second initial threshold, $S_{intersearch}$, corresponding to a second initial rate of the initial set for the inter-frequency measurement.

2. The method of claim 1, wherein the performing the set of one or more measurements at the initial set of rates comprises performing at least one of a detection cycle to detect one or more neighboring cells or a measurement cycle to measure parameters of one or more detected neighboring cells.

3. The method of claim 2, wherein the performing the measurement cycle comprises performing:
the intra-frequency measurement for each of the detected neighboring cells at the first initial rate;
the inter-frequency measurement for each of the detected neighboring cells at the second initial rate; and
an inter-radio access technology (rat) measurement or detection of one or more neighboring cells at a third initial rate of the initial set, and wherein the adjusting the initial set of rates comprises adjusting the first, second, and third initial rates.

4. The method of claim 1, wherein the determining the signal condition comprise measuring a cell quality value of the signal received from the serving cell, and wherein the signal condition is equal to the cell quality value.

5. The method of claim 1, wherein the determining the signal condition comprises:
measuring a cell quality value of the signal received from the serving cell; and
subtracting a minimum required quality level and a power compensation value from the cell quality value, wherein the signal condition is equal to the cell quality value after the subtracting.

6. The method of claim 5, further comprising determining the power compensation value, comprising:
determining a maximum transmission power level that can be used by the user device when accessing the serving cell;
determining a maximum radio frequency (RF) output power of the user device; and
subtracting the maximum RF output power from the maximum transmission power level to generate a computed value, wherein the power compensation value is the greater of the computed value and zero.

7. The method of claim 1, wherein the adjusting the initial set of rates based on the signal condition comprises:
setting the first initial rate to a first rate when the signal condition is less than a first threshold level of the plurality of threshold levels;
setting the first initial rate to a second rate when the signal condition is greater than a second threshold level of the plurality of threshold levels; and
setting the first initial rate to a third rate when the signal condition is greater than the first threshold level and less than second threshold level, wherein the third rate is less than the second rate and the first rate is less than the third rate;
incrementally increasing the first initial rate from the third rate to the first rate as the signal condition decreases towards the first threshold level; and
incrementally reducing the first initial rate from the third rate to the second rate as the signal condition increases away from the first threshold level.

8. The method of claim 7, wherein the third rate is every paging cycle when the user device is in the DRX mode, and wherein the second rate is less than every paging cycle.

9. The method of claim 7, wherein the third rate is defined by a standard specification, and wherein the second rate is a variable rate that is less than the second initial rate.

10. The method of claim 9, wherein the standard specification is the 3rd Generation Partnership Projection (3GPP) specification.

11. The method of claim 1, wherein the user device is an electronic book reader.

12. A user device, comprising:
a memory; and
a processing device, coupled to the memory, wherein the processing device is configured to:
perform a set of one or more measurements at an initial set of rates when the user device is in a discontinuous reception (DRX) mode, wherein the set of one or more measurements comprises an intra-frequency measurement for each of detected neighboring cells and an inter-frequency measurement for each of the detected neighboring cells;
determine a signal condition of a signal received from a serving cell; and
adjust the initial set of rates based on the signal condition by:
comparing the signal condition against a first plurality of threshold levels for the intra-frequency measurement and selecting a corresponding rate from a first plurality of rates for the intra-frequency measurement based on the comparing, wherein the first plurality of threshold levels comprise at least three threshold levels that are defined from zero to a first initial threshold, $S_{intrasearch}$, corresponding to a first initial rate of the initial set for the intra-frequency measurement; and
comparing the signal condition against a second plurality of threshold levels for the inter-frequency measurement and selecting a corresponding rate for the inter-frequency measurement based on the comparing against the second plurality of threshold levels, wherein the second plurality of threshold levels comprise at least three threshold levels that are defined from zero to a second initial threshold, $S_{intersearch}$, corresponding to a second initial rate of the initial set for the inter-frequency measurement.

13. The user device of claim 12, wherein the selection of one of the first plurality of rates that is less than the first initial rate reduces a current drain by the user device when the user device is in the DRX mode.

14. The user device of claim 12, further comprising a communication circuit, coupled to the processing device, wherein the communication circuit comprising at least one of a transceiver or a transmitter and a receiver.

15. The user device of claim 12, wherein the processing device is configured to execute a measurement module to measure a cell quality value of the signal received from the serving cell to determine the signal condition, and wherein the signal condition is equal to the cell quality value.

16. The user device of claim 15, wherein the processing device is further configured to subtract a minimum required quality level and a power compensation value from the cell quality value to determine the signal condition.

17. The user device of claim 16, wherein the processing device is configured to determine a maximum transmission power level that can be used by the user device when accessing the serving cell, and a maximum radio frequency (RF) output power of the user device, wherein the processing device is further configured to subtract the maximum RF output from the maximum transmission power level to generate a computed value, and wherein the power compensation value is the greater of the computed value and zero.

18. The user device of claim 12, wherein the initial set of rates is defined in the 3rd Generation Partnership Projection (3GPP) specification.

19. A non-transitory computer readable storage medium including instructions that, when executed by a processing device, cause the processing device to perform operations comprising:
performing, by the processing device, a set of one or more measurements at an initial set of rates when a user device is in a discontinuous reception (DRX) mode, wherein the set of one or more measurements comprises an intra-frequency measurement for each of detected neighboring cells and an inter-frequency measurement for each of the detected neighboring cells;
determining a signal condition of a signal received from a serving cell; and
adjusting the initial set of rates based on the signal condition, wherein the adjusting the initial set of rates based on the signal condition comprises:
comparing the signal condition against a first plurality of threshold levels for the intra-frequency measurement and selecting a corresponding rate from a first plurality of rates for the intra-frequency measurement based on the comparing, wherein the first plurality of threshold levels comprise at least three threshold levels that are defined from zero to a first initial threshold, $S_{intrasearch}$, corresponding to a first initial rate of the initial set for the intra-frequency measurement; and comparing the signal condition against a second plurality of threshold levels for the inter-frequency measurement and selecting a corresponding rate for the inter-frequency measurement based on the comparing against the second plurality of threshold levels, wherein the second plurality of threshold levels comprise at least three threshold levels that are defined from zero to a second initial threshold, $S_{intersearch}$, corresponding to a second initial rate of the initial set for the inter-frequency measurement.

20. The computer readable storage medium of claim 19, wherein the performing the set of one or more measurements at the initial set of rates comprises performing at least one of a detection cycle to detect one or more neighboring cells or a measurement cycle to measure parameters of one or more detected neighboring cells.

21. The computer readable storage medium of claim 20, wherein the performing the measurement cycle comprises performing:

the intra-frequency measurement for each of the detected neighboring cells at the first initial rate;

the inter-frequency measurement for each of the detected neighboring cells at the second initial rate; and an inter-radio access technology (rat) measurement or detection of one or more neighboring cells at a third initial rate of the initial set, and wherein the adjusting the initial set of rates comprises adjusting the first, second, and third initial rates.

\* \* \* \* \*